(12) United States Patent
Kato

(10) Patent No.: US 9,809,092 B2
(45) Date of Patent: Nov. 7, 2017

(54) DOOR IMPACT BEAM FOR VEHICLE

(71) Applicant: SANGO CO., LTD., Miyoshi-shi, Aichi (JP)

(72) Inventor: Toshiki Kato, Miyoshi (JP)

(73) Assignee: Sango Co., Ltd. (JP)

( * ) Notice: Subject to any disclaimer, the term of this patent is extended or adjusted under 35 U.S.C. 154(b) by 0 days.

(21) Appl. No.: 15/432,466

(22) Filed: Feb. 14, 2017

(65) Prior Publication Data
US 2017/0240030 A1 Aug. 24, 2017

(30) Foreign Application Priority Data

Feb. 19, 2016 (JP) .................................. 2016-030339
Dec. 15, 2016 (JP) .................................. 2016-243607

(51) Int. Cl.
*B60J 5/04* (2006.01)

(52) U.S. Cl.
CPC ........... *B60J 5/0443* (2013.01); *B60J 5/0468* (2013.01); *B60J 5/0483* (2013.01)

(58) Field of Classification Search
CPC ....... B60J 5/0443; B60J 5/0468; B60J 5/0483
USPC ...................................................... 296/146.6
See application file for complete search history.

(56) References Cited

U.S. PATENT DOCUMENTS

| | | | | |
|---|---|---|---|---|
| 4,381,972 A | * | 5/1983 | Stog | C10B 25/06 202/248 |
| 4,529,244 A | * | 7/1985 | Zaydel | B62D 29/048 24/289 |
| 4,573,733 A | * | 3/1986 | Zaydel | B62D 29/048 248/901 |
| 4,597,153 A | * | 7/1986 | Zaydel | B62D 29/048 29/434 |
| 9,597,947 B2 | * | 3/2017 | Friedman | B60J 5/0463 |
| 2003/0160476 A1 | * | 8/2003 | Moriyama | B60J 5/043 296/202 |
| 2007/0080559 A1 | * | 4/2007 | Stolarski | B60J 5/0404 296/146.6 |

(Continued)

FOREIGN PATENT DOCUMENTS

| | | |
|---|---|---|
| JP | 5-24118 U | 3/1993 |
| JP | 2003-252057 A | 9/2003 |

*Primary Examiner* — H Gutman
(74) *Attorney, Agent, or Firm* — Wood, Phillips, Katz, Clark & Mortimer

(57) ABSTRACT

A door impact beam for a vehicle includes a beam main body 2 and an attaching portion 3 formed of first and second brackets 4 and 5, the first bracket 4 is coupled to the second bracket 5 by a coupling portion 20 to enable absorbing a relative movement due to difference in thermal expansion between the beam main body 2 and the components 6 of the vehicle door, a first locking hole 11 is bored in one of the first and second brackets 4 and 5 and a second locking hole 12 is bored in the other bracket, the first and second locking holes 11 and 12 are adapted to be locked by a temporarily fixing member 13 at a normal temperature and the temporarily fixing member 13 is adapted to be softened at a predetermined temperature or higher, and the second locking hole 12 includes an engaging hole 12*a* adapted to be engaged with the temporarily fixing member at a normal temperature and a slit 12*b* which is smaller in width than the maximum inner diameter of the engaging hole 12*a*.

2 Claims, 6 Drawing Sheets

(56) References Cited

U.S. PATENT DOCUMENTS

| | | | |
|---|---|---|---|
| 2011/0229250 A1* | 9/2011 | Kleber | B60J 5/0437 403/29 |
| 2015/0123423 A1* | 5/2015 | Hasegawa | B60J 5/0427 296/146.6 |
| 2016/0280048 A1* | 9/2016 | Friedman | B60J 5/0468 |

* cited by examiner

DOOR IMPACT BEAM FOR VEHICLE

BACKGROUND OF THE INVENTION

Field of the Invention

The present invention relates to a door impact beam for a vehicle.

A door impact beam being a reinforcement member is attached inside a vehicle door such as an automobile and the like to suppress the deformation of a vehicle interior caused when a vehicle has a collision or rolls sideways and the like.

Background Art

In recent years, the beam main body of the door impact beam is formed of an iron-based material because it requires stiffness, and a door outer panel, on the other hand, is formed of aluminum alloy to make the panel lightweight.

A painting process is performed with the door impact beam attached to the vehicle door. Exposing them to high temperature when dried in the painting process may cause a distortion on a panel surface due to the plastic deformation of the outer panel of the vehicle door because a heat expansion coefficient is different between aluminum alloy and iron to cause a difference in thermal expansion between the door outer panel formed of aluminum alloy and the beam main body formed of iron.

Up to now, in order to suppress the above distortion, the difference in thermal expansion between the aluminum alloy and iron has been absorbed such that a bolt for attaching an attachment bracket provided on both ends of the beam main body to the vehicle door is kept loose without the bolt being completely tightened at the step before the painting process, and then the bolt is tightened to fix the door impact beam to the door outer panel after the painting process is finished (refer to JP-A-2003-252057 corresponding to U.S. Pub No. U.S. 2003/0160476A1).

Attaching the attachment bracket formed of an iron-based material to the vehicle door formed of aluminum alloy may cause electrolytic corrosion and the like therebetween. In order to prevent the electrolytic corrosion, the attachment bracket may be formed of two components of a first bracket composed of an iron-based material securely installed to the beam main body and a second bracket composed of aluminum alloy which can be attached to the vehicle door, in addition, the difference in the thermal expansion may be absorbed such that the first and second brackets are fastened to by a fastening bolt, the fastening bolt is kept loose without the bolt being completely tightened at the step before the painting process, and then the bolt is tightened after the painting process is finished.

A technique has been known in which a first bracket is provided at both ends of the beam main body, a second bracket is provided at the vehicle door, a long hole parallel to the axial direction of the first bracket is bored therein, and a round hole is bored in the second bracket to fix the long hole to the round hole by a fastening bolt (Refer to JP-U-H05-24118). The technique may be applied to the technique discussed in the above JP-A-2003-252057.

In the related art discussed in JP-U-H05-24118, however, the door impact beam needs to be attached to the vehicle door with the fastening bolt for fastening the first and second brackets kept loose. In this case, the second bracket is swung against the first bracket to cause a problem that makes it difficult to align the second bracket with the outer panel of the vehicle door.

When the door impact beam is attached to the vehicle door, the first and second brackets are fastened by the fastening bolt to fix the mutual positional relationship and the fastening bolt may be loosened after the attachment to absorb the above-mentioned difference in thermal expansion, however, which increases and complicates working processes.

The present invention has been made to propose a door impact beam for a vehicle in which the above problems have been solved.

SUMMARY OF THE INVENTION

The present invention has been made to solve the above problems. A door impact beam for a vehicle includes a beam main body and an attaching portion provided on the beam main body and attached to a component of a vehicle door, in which the attaching portion includes first and second brackets and the first and second brackets are arranged to be at least partly superimposed on each other, the first bracket is coupled to the second bracket by a coupling portion to enable absorbing a relative movement due to difference in thermal expansion between the beam main body and the components of the vehicle door, a first locking hole is bored in one of the first and second brackets and a second locking hole is bored in the other bracket, the first and second locking holes are adapted to be locked by a temporarily fixing member at a normal temperature and the temporarily fixing member is adapted to be softened at a predetermined temperature or higher, and the second locking hole includes an engaging hole adapted to be engaged with the temporarily fixing member at a normal temperature and a slit which communicates with the engaging hole, extends from the engaging hole, and is smaller in width than the maximum inner diameter of the engaging hole.

The slit may be formed so that the extending direction thereof becomes parallel to the axial direction of the beam main body at a part where the attaching portion is attached to the beam main body.

In the door impact beam for a vehicle according to the present invention, the first and second brackets are locked by a temporarily fixing member in a normal temperature to make it easy to align each other when the door impact beam for a vehicle is attached to the vehicle door, which allows attachment workability to be improved.

When the temporarily fixing member is heated to a predetermined temperature or higher at a drying stage in the painting process, the temporarily fixing member is softened to allow a coupling unit to absorb the difference in thermal expansion between the components of the beam main body and the vehicle door.

Other objects, features and advantages of the invention will become apparent from the following description of the embodiments of the invention taken in conjunction with the accompanying drawings.

DETAILED DESCRIPTION OF THE PREFERRED EMBODIMENT

Embodiments for practicing the present invention are described below based on examples shown in figures.

A door impact beam for a vehicle according to a first embodiment of the present invention is described below based on FIGS. 1 to 6.

Figure 1:
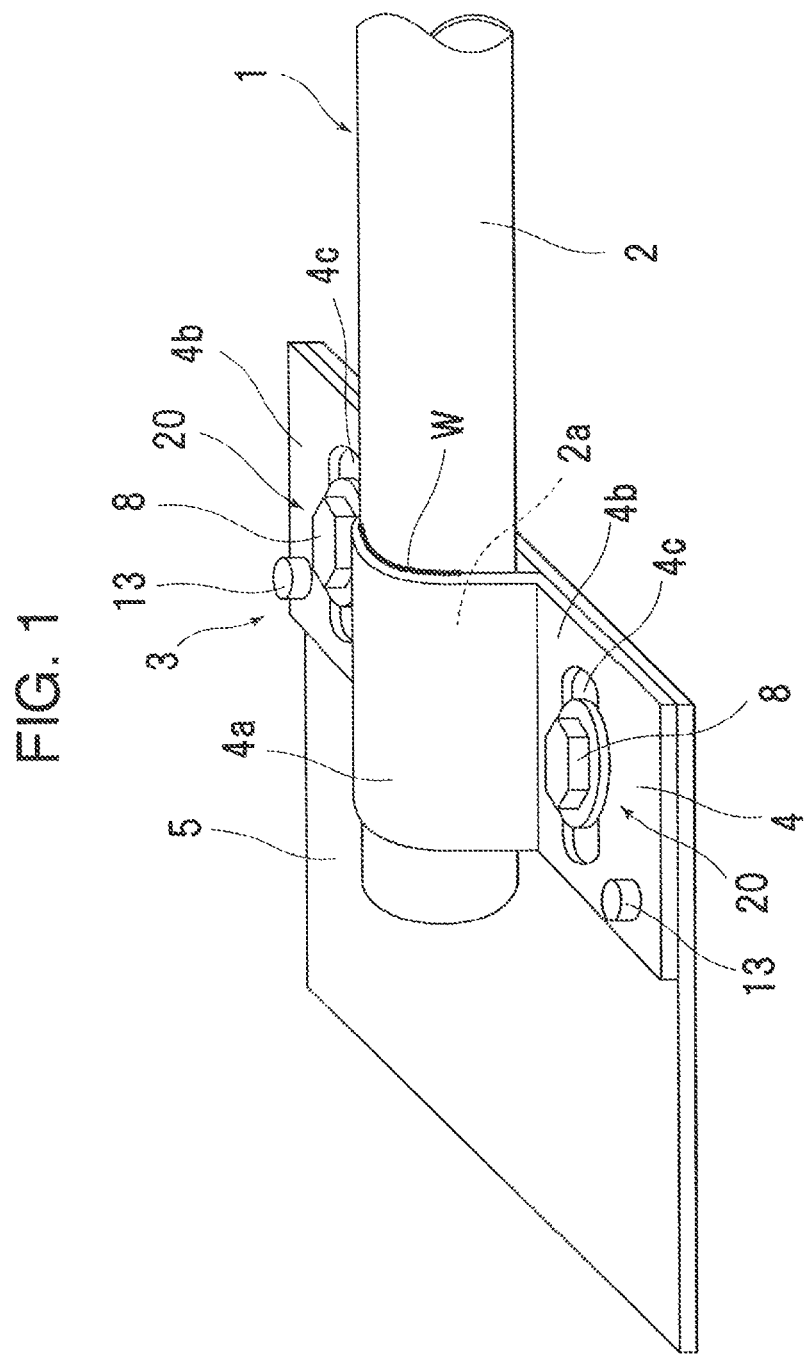
FIG. 1 is a perspective view of the door impact beam for a vehicle according to a first embodiment of the present invention.
Figure 2:
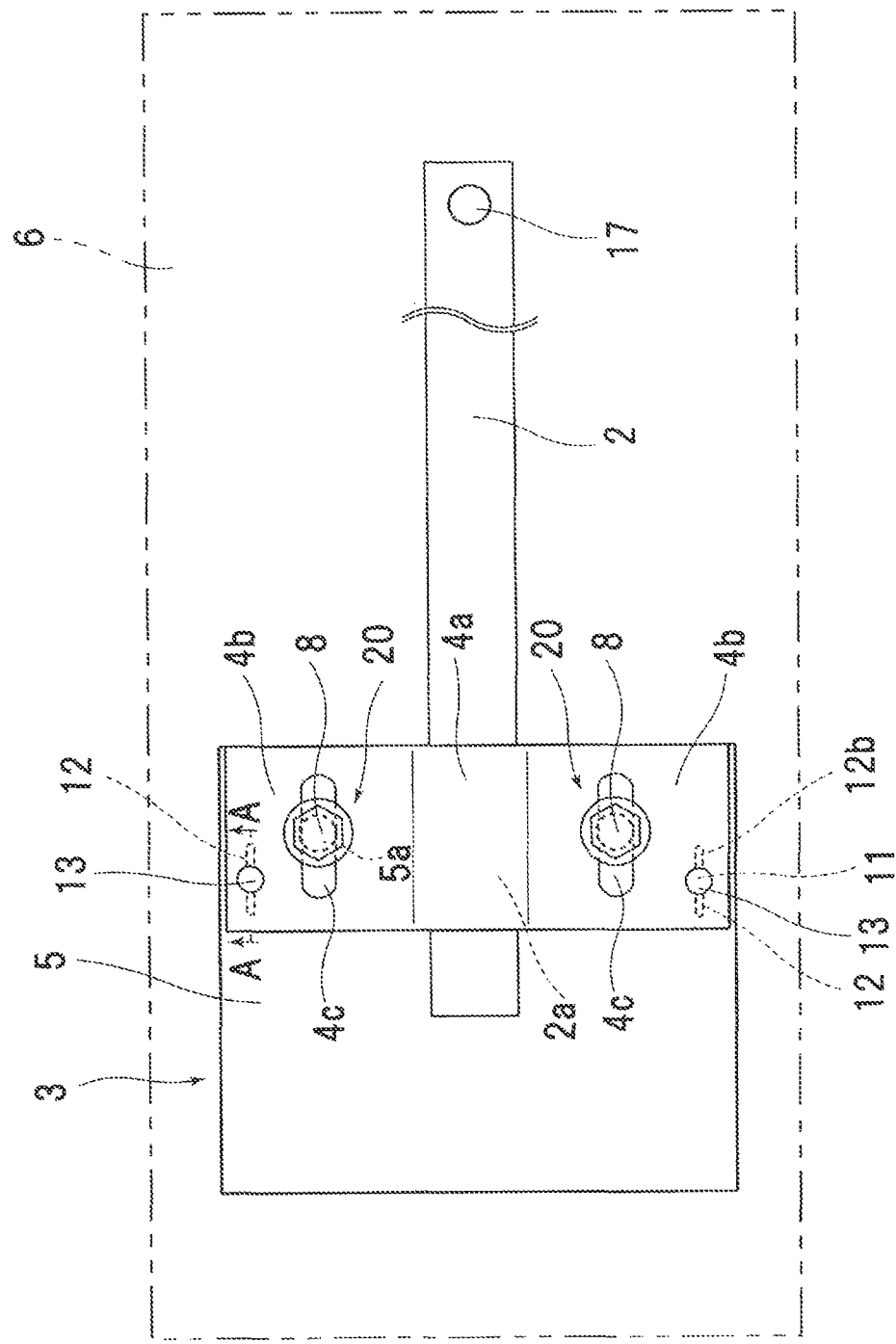
FIG. 2 is a plan view of FIG. 1.

A door impact beam 1 for a vehicle includes a beam main body 2 and an attaching portion 3 as shown in FIGS. 1 and 2.

The beam main body 2 is formed of a pipe made of an iron-based material and the attaching portion 3 is provided at one of the ends (the left side in FIGS. 1 and 2) of the beam main body 2. The attaching portion 3 includes a first bracket 4 made of an iron-based material and a second bracket 5 made of aluminum alloy.

The first bracket 4 is superimposed on a surface on which the door impact beam 1 for a vehicle is attached, in a second bracket 5, that is, on a surface opposite to the inner surface of a door outer panel 6 which is a component of a vehicle door in such a manner that at least one portion thereof is superposed. In the present embodiment, the second bracket 5 is longer in both vertical and horizontal directions thereof than the first bracket 4 in FIG. 2.

Figure 3:
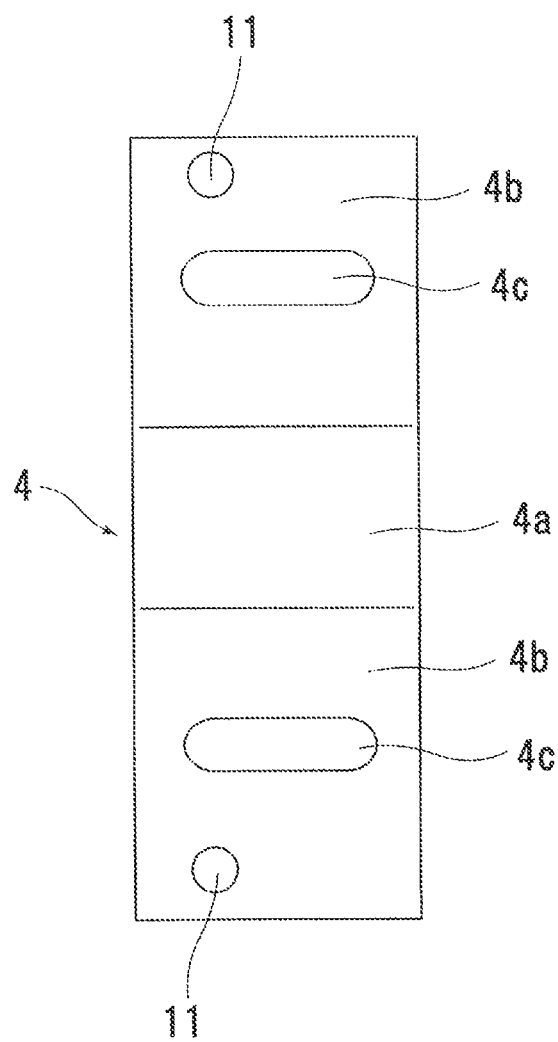
FIG. 3 is a plan view of a first bracket used for the first embodiment of the present invention.

The first bracket 4 is provided with an arc attachment portion 4a on the main-body side securely installed on the beam main body 2 by welding W and flat plate shaped attachment portions 4b and 4b on the bracket side provided on both sides of the attachment portion 4a on the main-body side in the direction orthogonal to the axis of the beam main body 2. As shown in FIG. 3, long holes 4c are bored in the attachment portions 4b on the bracket side. The long holes 4c are formed so that the longitudinal direction thereof is made parallel to the axis direction of the beam main body 2 in a portion 2a where the attachment portion 4a on the main-body side of the beam main body 2 is securely installed.

Figure 4:
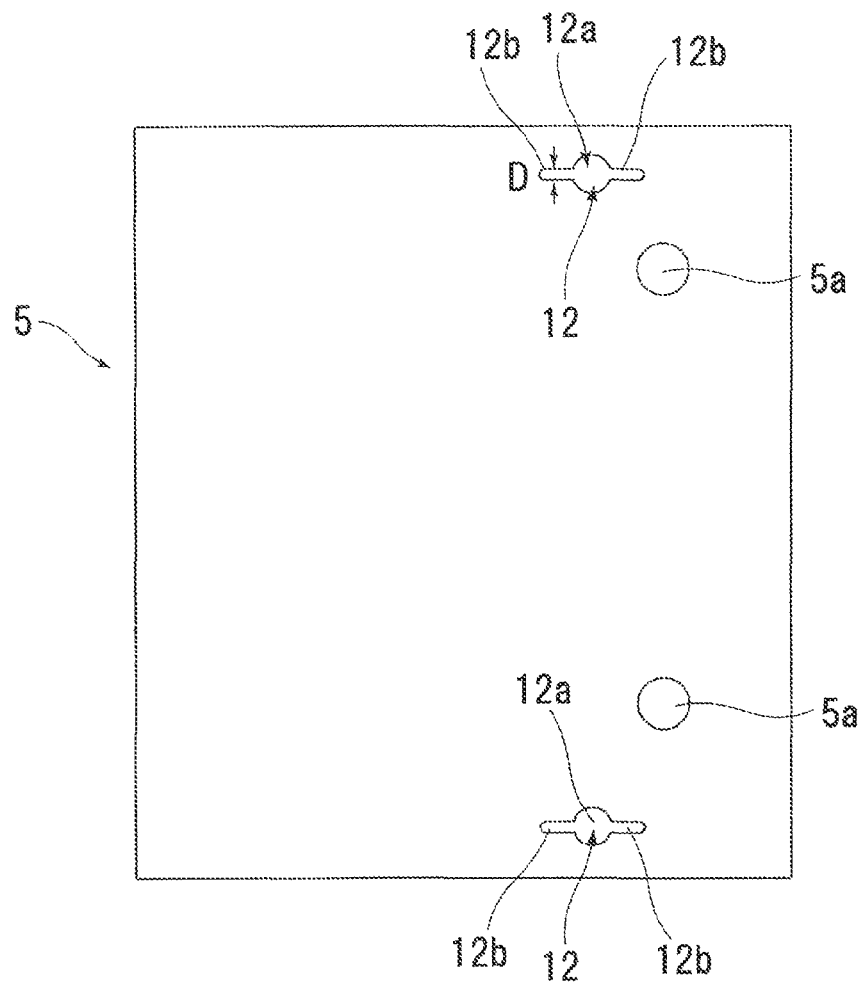
FIG. 4 is a plan view of a second bracket used for the first embodiment of the present invention.

As shown in FIG. 4, the second bracket 5 is formed in a square flat-plate pattern. Two round holes 5a are bored in the second bracket 5 at positions corresponding to the long holes 4c of the first bracket 4. A female screw is formed on an inner peripheral surface of the round hole 5a of the second bracket 5. A male screw of a bolt 8 being a coupling member can be screwed into the female screw.

As shown in FIG. 3, first locking holes 11 each being in a circular shape are bored in the attachment portions 4b on the bracket side on the first bracket 4 both at the outside ends in the radial direction with the axis of the beam main body 2 as a center.

Two second locking holes 12 are bored in the second bracket 5 at the position corresponding to the first locking hole 11 of the first bracket 4. The second locking hole 12 includes an engaging hole 12a engaged with a temporarily fixing member 13 described below and slits 12b and 12b extending to two directions at one and the other ends in the axial direction of the beam main body 2 at a part 2a where the attachment portion 4a on the main-body side of the beam main body 2 is securely installed. Each slit 12b is formed to be smaller in width D than the maximum inner diameter of the engaging hole 12a and communicates with the engaging hole 12a. In other words, the extending direction of the slit 12b is parallel to the longitudinal direction of the long hole 4c of the first bracket 4. The first locking hole 11 and the engaging hole 12a are substantially equal in diameter.

Figure 5:
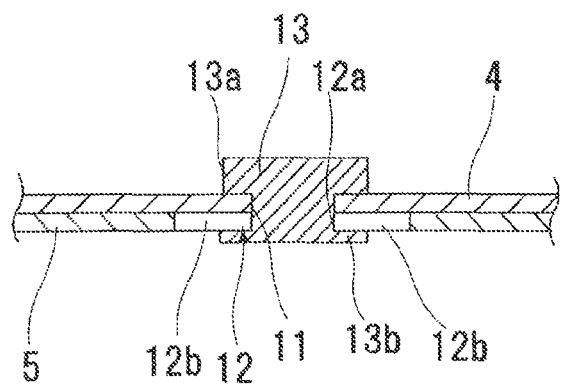
FIG. 5 is an enlarged cross section along the line A-A in FIG. 2.
Figure 6:
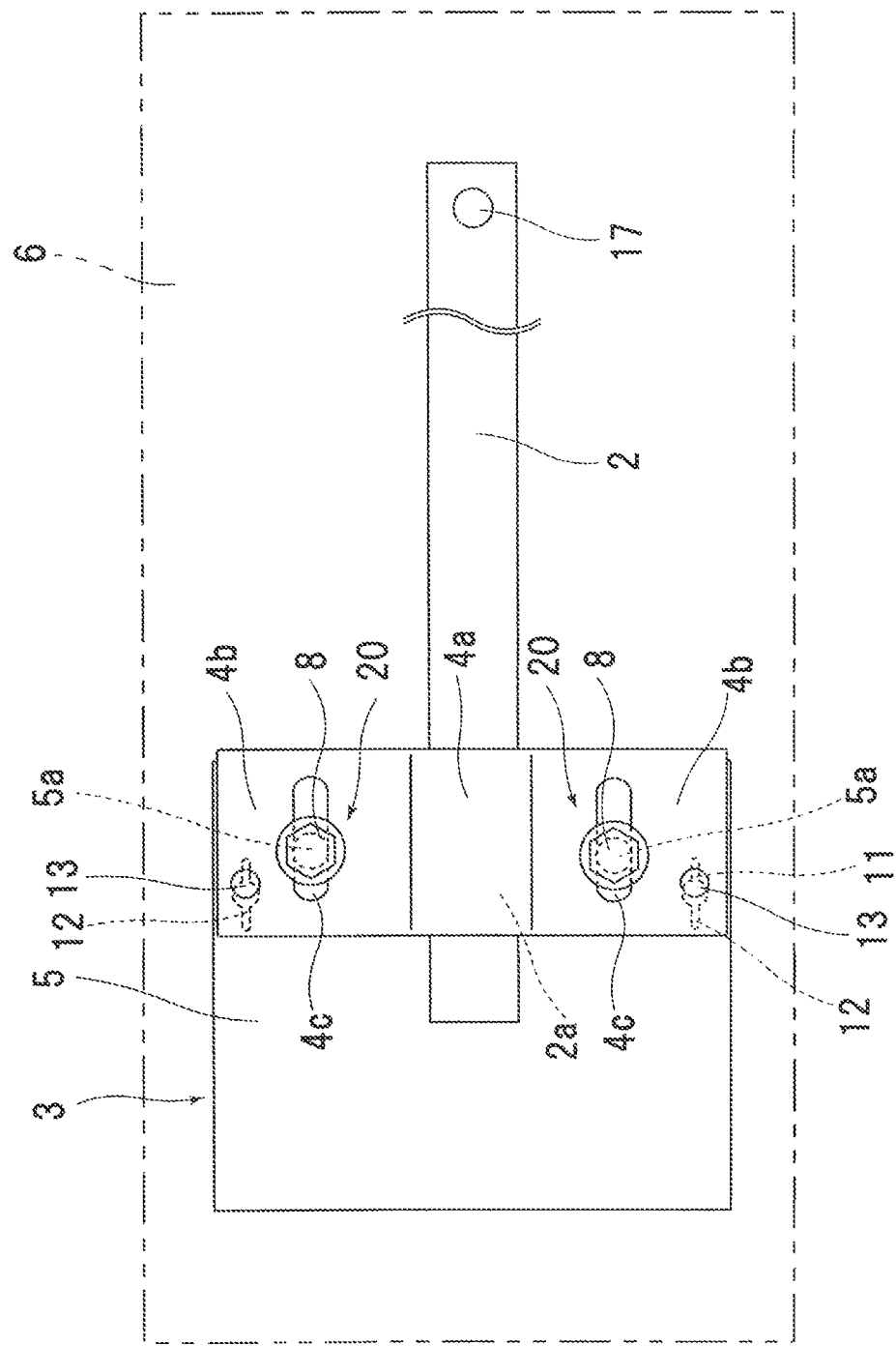
FIG. 6 is a plan view showing a state where the first and second brackets are relatively moved from the state in FIG. 2.

As shown in FIG. 5, the temporarily fixing member 13 which is larger in diameter than the width D of the slit 12b is inserted in common into the first locking hole 11 of the first bracket 4 and the engaging hole 12a of the second locking hole 12 in the second bracket 5 at a normal temperature, that is, at a natural temperature where it is neither heated nor cooled, to keep the first and second brackets 4 and 5 unable to relatively move at a normal temperature. In other words, the first and second brackets 4 and 5 are not relatively swung.

A predetermined surface treatment is applied to a part where the first and second brackets 4 and 5 contact each other at least to prevent electrolytic corrosion from occurring.

The temporarily fixing member 13 is locked both by the locking holes 11 and 12 at a normal temperature but softened by heating at the predetermined temperature or higher (at a drying temperature or higher in the painting process in the present embodiment, at 100° C. or higher, for example). The temporarily fixing member 13 is formed of thermoplastic resin or rubber material, for example. It is preferable that temporarily fixing member 13 does not melt at a drying stage in the painting process.

As shown in FIG. 5, the temporarily fixing member 13 is provided with retaining portions 13a and 13b at both ends in the axial direction of the locking holes 11 and 12. The temporarily fixing member 13 keeps the locking holes 11 and 12 locked to prevent the temporarily fixing member 13 from coming off. The retaining portions 13a and 13b are formed in a flange shape larger in diameter than the engaging hole 12a in the embodiment in FIG. 5, however, the retaining portions 13a and 13b may be formed in any shape which can prevent the temporarily fixing member 13 from coming off.

The other end of the beam main body 2 is directly fixed to the inner surface of the door outer panel 6 using an attaching fitting 17. The other end of the beam main body 2 may be provided with the same attaching portion as the attaching portion 3 to fix the other end of the beam main body 2 to the inner surface of the door outer panel 6 using the attaching portion.

The following describes work for attaching the door impact beam 1 for a vehicle to the inner surface of the door outer panel 6 which is the component of the vehicle door.

When the door impact beam 1 for a vehicle is attached to the inner surface of the door outer panel 6, the bolt 8 is kept not tight but loose. The bolt 8 is loosely fit into the long hole 4c of the first bracket 4. Because it is at a normal temperature, the temporarily fixing member 13 prevents the second bracket 5 from swinging against the first bracket 4 and holds it at the predetermined position, so that the door impact beam 1 for a vehicle can be easily aligned with the inner surface of the door outer panel 6 to improve workability for the attachment work.

The door impact beam 1 for a vehicle is placed at a predetermined position on the inner surface of the door outer panel 6. At one end of the beam main body 2, a self-piercing rivet is driven into the second bracket 5 to fix the second bracket 5 to the inner surface of the door outer panel 6, and the other end thereof is fixed to the inner surface of the door outer panel 6 using the attaching fitting 17.

At the next step, the painting process is performed. Heating the door impact beam 1 for a vehicle and the door outer panel 6 at the predetermined temperature or higher in drying softens the temporarily fixing member 13. The bolt 8 is fastened not tightly but loosely and is loosely fit into the long hole 4c of the first bracket 4, so that the first bracket 4 can relatively move along the long hole 4c with respect to the second bracket 5. In this drying, even if a difference in thermal expansion occurs between the door outer panel 6 and the beam main body 2, the difference in thermal expansion can be absorbed to prevent the door outer panel 6 from plastically deforming and distortion from occurring on the panel surface.

Thus, the bolt 8, the long hole 4c of the first bracket 4, and the round hole 5a of the second bracket 5 form a coupling portion 20 which couples the first bracket to the second bracket, which makes it possible to absorb the relative movement due to difference in thermal expansion between the beam main body 2 and the door outer panel 6. The coupling portion 20 which couples the first bracket 4 to the second bracket 5 may have any structure which can absorb the relative movement due to difference in thermal expansion between the beam main body 2 and the door outer panel 6.

If the temporarily fixing member 13 is softened, and if the relative movement due to difference in thermal expansion between the beam main body 2 and the door outer panel 6 occurs because the extending direction of the slit 12b is parallel to the longitudinal direction of the long hole 4c of the first bracket 4, the temporarily fixing member 13 is moved in the slit 12b. For this reason, because the temporarily fixing member 13 can be moved in the slit 12b, the temporarily fixing member 13 is retained in the door impact beam 1 for a vehicle without being sheared when the first and second brackets 4 and 5 move with respect to each other. This can prevent the temporarily fixing member 13 from being sheared and peeling off from the door impact beam 1 for a vehicle and prevent a foreign matter caused by the peeling from moving inside the door to produce an abnormal noise.

After the painting process is finished, the bolt is tightened to fix the door impact beam 1 for a vehicle to the inner surface of the door outer panel 6 to complete the attachment of the door impact beam 1 for a vehicle to the door outer panel 6.

In the above embodiment, there are provided two long holes 4c of the first bracket 4 and two round holes 5a of the second bracket 5, but the number of them may be arbitrarily determined. Furthermore, two first locking holes 11 of the first bracket 4 and two second locking holes 12 of the second bracket 5 are provided, but the number of them may be arbitrarily determined. Still furthermore, the engaging hole 12a in the first and second locking holes 11 and 12 may be a polygonal hole instead of a round hole.

In the above embodiment, the door impact beam 1 for a vehicle is attached to the door outer panel 6, however, the door impact beam 1 for a vehicle may be attached to any member which is a component for a vehicle door, for example, to a door inner panel.

Figure 7:
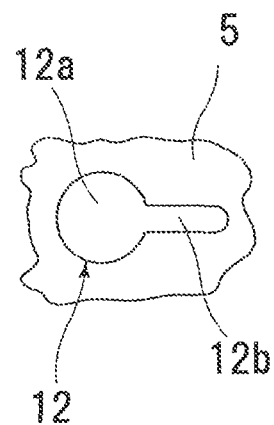
FIG. 7 is a plan view of a second locking hole used for a second embodiment of the present invention.

In the first embodiment mentioned above, the slits 12b and 12b extending to two directions on one and the other sides in the axial direction of the beam main body 2 are provided in the second locking hole 12, however, as shown in FIG. 7, only one slit 12b extending to the other end may be provided instead of providing the slit 12b extending to one end.

Other structures are similar to those in the first embodiment, so that the description thereof is omitted.

In the second embodiment also, effects similar to those of the first embodiment can be achieved.

Figure 8:
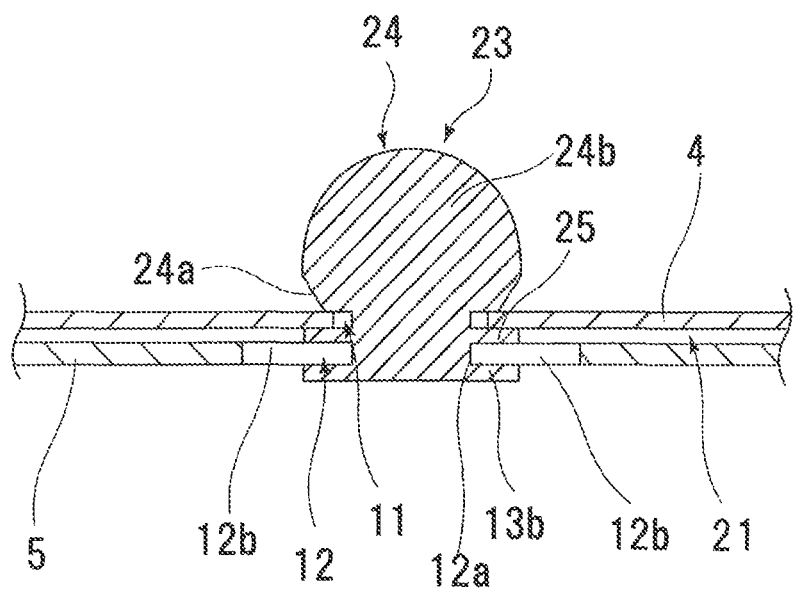
FIG. 8 is a figure corresponding to FIG. 5 in a third embodiment of the present invention.

In the first and second embodiments, the first and second brackets 4 and 5 are designed to at least partly abut with each other and to be superimposed with each other. However, as shown in FIG. 8, the first and second brackets 4 and 5 may be at least partly superimposed with each other to produce a gap 21 therebetween.

The gap 21 between the first and second brackets 4 and 5 may be formed by using a given method. In a third embodiment, however, a washer (not shown) is interposed between the first and second brackets 4 and 5 at a part where the long hole 4c of the first bracket 4 and the round hole 5a of the second bracket 5 are positioned and the bolt 8 is inserted into the washer, the long hole 4c, and the round hole 5a to form a gap between the first and second brackets 4 and 5.

In the third embodiment, a temporarily fixing member 23 being a modification example of the temporarily fixing member 13 of the first and second embodiments was used. The temporarily fixing member 13 in the first and second embodiments is provided with retaining portions 13a and 13b at both ends in the axial direction of the locking holes 11 and 12. In the temporarily fixing member 23 of the third embodiment, the retaining portion 13a was formed by a swelling portion 24 and the retaining portion 13b was formed similarly to the retaining portion 13b of the first and second embodiments.

The swelling portion 24 is formed on the side of the first bracket 4 and larger in diameter than the first locking hole 11 and the engaging hole 12a and includes an engaging portion 24a formed so that the diameter thereof gradually becomes large toward the end thereof. A hemisphere guide portion 24b of which diameter gradually becomes small to the end thereof is formed at a chip portion far from the engaging portion 24a. The guide portion 24b can be formed in a given shape such that the diameter thereof gradually becomes small to the end thereof and the swelling portion 24 has the guide portion 24b of which diameter gradually becomes small to the end thereof, so that the swelling portion 24 can be formed in a given shape such as a spherical shape instead of the shape shown in FIG. 8.

As shown in FIG. 8, the temporarily fixing member 23 is provided with a flange 25 engaging the gap 21 between the first and second brackets 4 and 5. The flange 25 does not have to be provided.

Other structures are similar to those in the first and second embodiments, so that the description thereof is omitted.

In the third embodiment also, effects similar to those of the first and second embodiments can be achieved.

In the third embodiment, the gap 21 is formed between the first and second brackets 4 and 5 to prevent painted film on the surface of the first and second brackets 4 and 5 from closely contacting with each other. Even if the first and second brackets 4 and 5 are relatively moved in the painting process, satisfactory painting can be performed.

The provision of the swelling portion 24 in the temporarily fixing member 23 makes it easy to insert the temporarily fixing member 23 into the locking hole 11 and the engaging hole 12a in such a manner that the swelling portion 24 is grasped and pulled and the swelling portion 24 can prevent the temporarily fixing member 23 from coming off.

In the first to third embodiments, the long hole 4c is bored in the first bracket 4 and the round hole 5a is bored in the second bracket 5. A round hole similar in shape to the round hole 5a of the first embodiment may be bored in the first bracket 4 and a long hole similar in shape to the long hole 4c of the first embodiment may be bored in the second bracket 5.

In the first to third embodiments, the first bracket 4 is provided with the first locking hole 11 and the second bracket 5 is provided with the second locking hole 12, however, a second locking hole similar in shape to the second locking hole 12 of the first embodiment may be bored in the first bracket 4 and the second bracket 5 may be provided with a first locking hole similar in shape to the first locking hole 11 of the first embodiment.

In the first to third embodiments, the self-piercing rivet is driven into the second bracket 5 to fix the second bracket 5 to the inner surface of the door outer panel 6, however, a plurality of attachment holes is formed in the second bracket 5 and a rivet may be inserted into the attachment holes and a predetermined attachment hole provided in the inner surface of the door outer panel 6 to cause the rivet to connect the second bracket 5 to the door outer panel 6.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A door impact beam for a vehicle comprising:
   a beam main body; and
   an attaching portion provided on the beam main body and attached to a component of a vehicle door;
   wherein the attaching portion includes first and second brackets and the first and second brackets are arranged to be at least partly superimposed on each other,
   the first bracket is coupled to the second bracket by a coupling portion to enable absorbing a relative movement due to difference in thermal expansion between the beam main body and the components of the vehicle door,
   a first locking hole is bored in one of the first and second brackets and a second locking hole is bored in the other bracket,
   the first and second locking holes are adapted to be locked by a temporarily fixing member at a normal temperature and the temporarily fixing member is adapted to be softened at a predetermined temperature or higher,
   and the second locking hole includes an engaging hole adapted to be engaged with the temporarily fixing member at a normal temperature and a slit which communicates with the engaging hole, extends from the engaging hole, and is smaller in width than the maximum inner diameter of the engaging hole.

2. The door impact beam for a vehicle according to claim 1, wherein
   the slit is formed so that the extending direction thereof becomes parallel to the axial direction of the beam main body at a part where the attaching portion is attached to the beam main body.

\* \* \* \* \*